United States Patent
Chen et al.

(10) Patent No.: US 9,846,923 B1
(45) Date of Patent: Dec. 19, 2017

(54) IMAGE CAPTURE AND CORRECTION METHOD

(71) Applicant: TECO IMAGE SYSTEMS CO., LTD., Taipei (TW)

(72) Inventors: Yan-Ting Chen, Taipei (TW); Ko-Meng Chen, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 0 days.

(21) Appl. No.: 15/377,102

(22) Filed: Dec. 13, 2016

(30) Foreign Application Priority Data

Nov. 11, 2016 (TW) .............................. 105136892 A

(51) Int. Cl.
    *H04N 5/235* (2006.01)
    *G06T 5/00* (2006.01)
    *H04N 7/18* (2006.01)

(52) U.S. Cl.
    CPC .............. *G06T 5/002* (2013.01); *H04N 7/183* (2013.01)

(58) Field of Classification Search
    CPC ..................... H04N 1/3878; G06K 9/3275
    See application file for complete search history.

(56) References Cited

U.S. PATENT DOCUMENTS 9,503,597 B1 * 11/2016 Chen .................. H04N 1/00822
9,769,347 B2 * 9/2017 Chen ........................ H04N 1/04

* cited by examiner

*Primary Examiner* — Gary C Vieaux
(74) *Attorney, Agent, or Firm* — Kirton McConkie; Evan R. Witt

(57) ABSTRACT

An image capture and correction method includes steps of providing an image capture device, moving the image capture device along a specific direction to obtain an captured image and position information, performing a correction operation to the captured image, calculating to obtain a skewed angle according to the position information, setting a coordinate value of the captured image as a target value, calculating to obtain a correction value according to the target value and the skewed angle, replacing the target value with the correction value, and judging whether to continue the correction operation. Then, the correction operation is finished and the corrected captured image is stored. Therefore, the skew of the captured image is corrected, a more accurate correction value is obtained, and the advantages of precisely correcting the captured image are achieved.

10 Claims, 3 Drawing Sheets

IMAGE CAPTURE AND CORRECTION METHOD

CROSS-REFERENCE TO RELATED APPLICATION

This application claims priority from Taiwan Patent Application No. TW 105136892, filed on Nov. 11, 2016, the entire contents of which are incorporated herein by reference for all purposes.

FIELD OF THE INVENTION

The present invention relates to an image capture and correction method, and more particularly to an image capture and correction method for correcting the captured image according to the position information.

BACKGROUND OF THE INVENTION

With the progress of technology and the popularization of electronic products, the demands on digitalized documents become stronger. Generally, the paper-type documents can be converted into digital files through an image capture process such as a scanning process or a photographing process, among which the quality of the images captured through the scanning process is better, and the characters in the images can be recognized more easily.

Nowadays, various kinds of scanners have been introduced into the market. For example, the widely-used scanners include flatbed scanners or handy scanners. Compared to the flatbed scanners, the volume of the handy scanners is smaller and lighter, and the handy scanners are more convenient to be carried with, such that the paper-type documents can be promptly converted into digital files.

However, when the handy scanners are used to capture images, errors may be occurred while operating the handy scanners or detecting the displacement, such that the skew of the image is caused. Furthermore, since the skew caused by the errors will increase as the length of image is getting longer, if the images are only integrally rotated, the skew will still exist in the rotated images, such that the captured images cannot be precisely corrected.

Therefore, there is a need of providing an image capture and correction method to solve the drawbacks in prior arts, correct the skew in the captured images, and achieve the advantages of precisely correcting the captured images.

SUMMARY OF THE INVENTION

It is an object of the present invention to provide an image capture and correction method in order to solve the drawbacks of prior art.

The present invention provides an image capture and correction method. By allowing the image capture device to obtain the position information, and calculating to obtain a skewed angle according to the position information, the errors occurred while operating the image capture device or detecting the displacement are corrected.

The present invention also provides an image capture and correction method. Through setting each coordinate value of the captured image as a target value and replacing the target value with the correction value, the skew of the captured image is corrected precisely.

The present invention further provides an image capture and correction method. By calculating the target value and the skew angle through a polygon interior angle sum approximation algorithm and a polar coordinate formula, an accurate correction value is obtained, and the advantage of precisely correcting the captured images is achieved.

In accordance with an aspect of the present invention, there is provided an image capture and correction method, comprising steps of: (a) providing an image capture device; (b) moving the image capture device along a specific direction to obtain an captured image and position information; (c) performing a correction operation to the captured image; (d) calculating to obtain a skewed angle according to the position information; (e) setting a coordinate value of the captured image as a target value; (f) calculating to obtain a correction value according to the target value and the skewed angle; (g) replacing the target value with the correction value; and (h) judging whether to continue the correction operation. If the result of the judgement of the step (h) is True, the step (e), the step (f), the step (g) and the step (h) are re-performed after the step (h), and if the result of the judgement of the step (h) is False, the correction operation is finished and the corrected captured image is stored.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
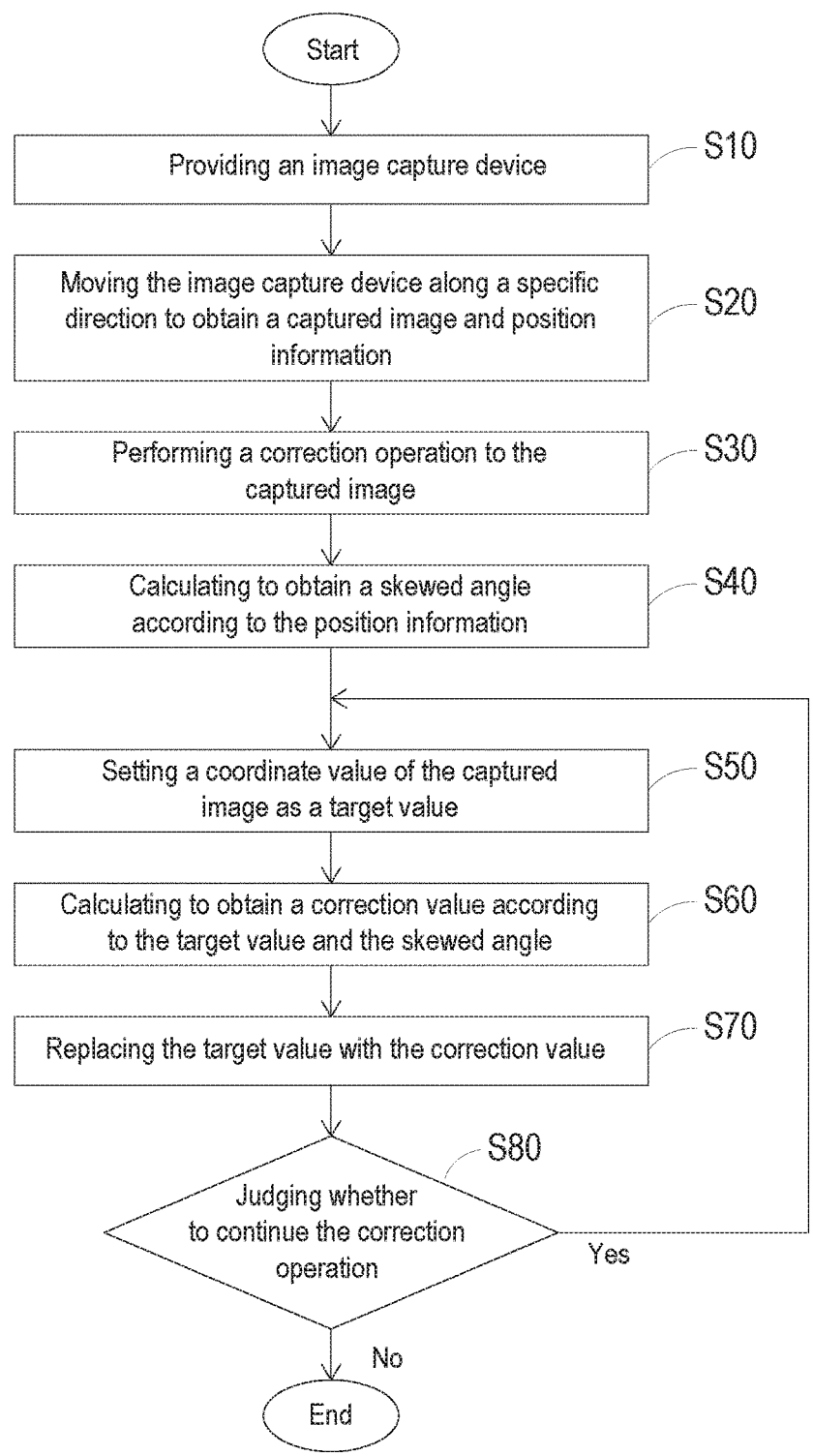
FIG. 1 schematically illustrates the flowchart of an image capture and correction method according to an embodiment of the present invention.
Figure 2:
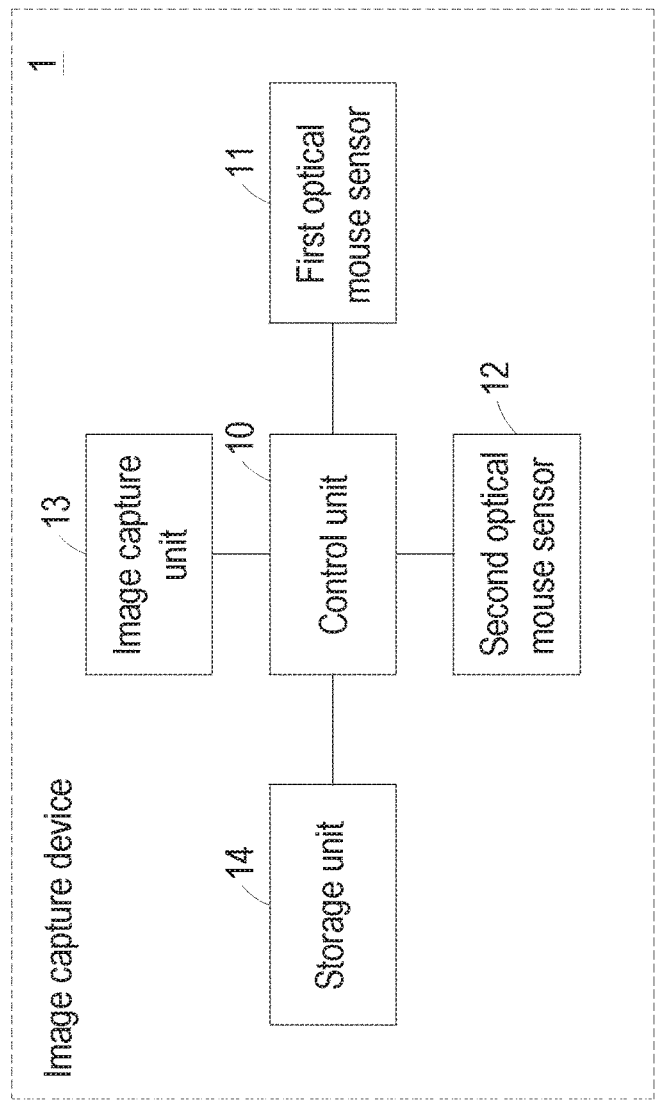
FIG. 2 schematically illustrates the configuration of an image capture device used in an image capture and correction method according to an embodiment of the present invention.
Figure 4:
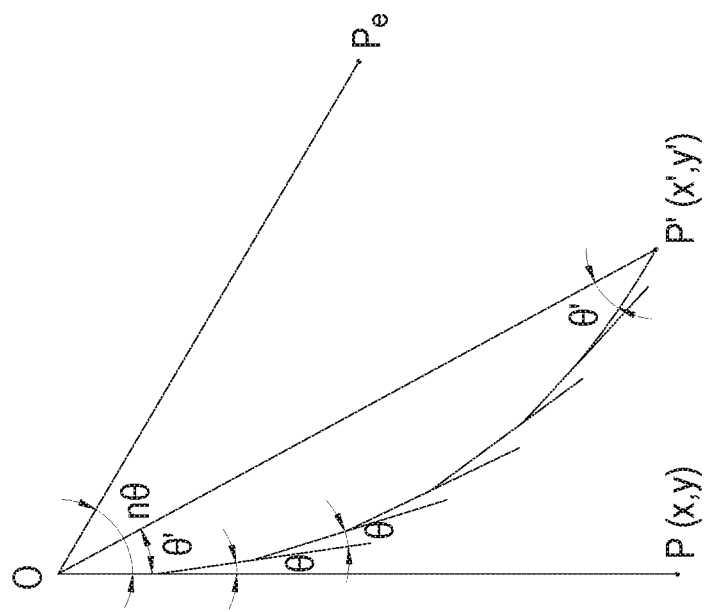
FIG. 4 schematically illustrates the target value and the correction value acquired by the image capture device used in the image capture and correction method of the present invention.
Figure 3:
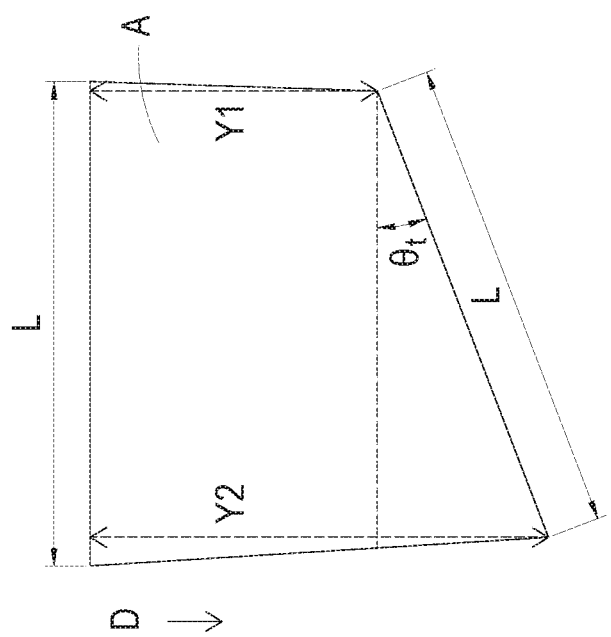
FIG. 3 schematically illustrates the position information and the skew angle acquired by the image capture device used in the image capture and correction method of the present invention.

Please refer to FIG. 1, FIG. 2, FIG. 3 and FIG. 4. FIG. 1 schematically illustrates the flowchart of an image capture and correction method according to an embodiment of the present invention. FIG. 2 schematically illustrates the configuration of an image capture device used in an image capture and correction method according to an embodiment of the present invention. FIG. 3 schematically illustrates the position information and the skew angle acquired by the image capture device used in the image capture and correction method of the present invention. FIG. 4 schematically illustrates the target value and the correction value acquired by the image capture device used in the image capture and correction method of the present invention. As shown in FIG. 1, FIG. 2, FIG. 3 and FIG. 4, the image capture and correction method comprises the following steps. Firstly, in a step S10, an image capture device 1 is provided, among which an example of the image capture device 1 includes but is not limited to a handy scanner. Then, in a step S20, the image capture device 1 is moved along a specific direction D to obtain a captured image A and position information. In some embodiments, the image capture device 1 further comprises a control unit 10, and the control unit 10 is connected with a first optical mouse sensor 11, a second optical mouse sensor 12 and an image capture unit 13. The first optical mouse sensor 11 and the second optical mouse sensor 12 are configured to obtain the position information, and the image capture unit 13 is configured to obtain the captured image A, but is not limited herein.

Then, in a step S30, a correction operation is performed to the captured image A. Next, in a step S40, a skewed angle $\theta_t$ of the captured image A is obtained by calculating according to the position information. Then, in a step S50, a coordinate value of the captured image A is set as a target value, which means that a coordinate value of a pixel point in the captured image A is taken to be set as a target value of a target point P. Then, in a step S60, a correction value of a correction point P' is obtained by calculating according to the target value and the skewed angle $\theta_t$. In addition, the step S40 and the step S60 are implemented through the control unit 10 of the image capture device 1.

Then, in a step S70, the target value is replaced with the correction value for correcting the skewed captured image A. When the correction value is out of the range of the captured image A, the target value is replaced with 0 or a specific value, such that the image boundary of the captured image A can be smooth. Then, in a step S80, judge whether to continue the correction operation. If the result of the judgement of the step S80 is True, the step S50, the step S60, the step S70 and the step S80 are re-performed after the step S80. In some embodiments, if the result of the judgement of the step S80 is False, the correction operation is finished and the corrected captured image A is stored. For example, the corrected captured image A is stored in a storage unit 14 of the image capture device 1, but is not limited herein. The storage unit 14 is connected with the control unit 10, and is configured to store the captured image A and the position information.

In some embodiments, the step S80 is a step through judging whether each coordinate value of the captured image A is set, to decide whether to continue the correction operation. When not each coordinate value of the captured image A is set, the result of the judgement of the step S80 is True, the correction operation is continued, and the step S50, the step S60, the step S70 and the step S80 are re-performed after the step S80. When each coordinate value of the captured image A is set, the result of the judgement of the step S80 is False, the correction operation is finished, and the corrected captured image A is stored.

In brief, the image capture and correction method of the present invention is by allowing the image capture device to obtain the position information, and calculating to obtain a skewed angle according to the position information, to correct the errors occurred while operating the image capture device or detecting the displacement. In addition, through setting each coordinate value of the captured image as a target value and replacing the target value with the correction value, the skew of the captured image is corrected precisely.

Please refer to FIG. 3 and FIG. 4. In some embodiments, the position information comprises a first moving value Y1 obtained through the first optical mouse sensor 11 moving along the specific direction D, and a second moving value Y2 obtained through the second optical mouse sensor 12 moving along the specific direction D. Furthermore, the first optical mouse sensor 11 and the second optical mouse sensor 12 have an interval L between each other, and the step S40 is a step of calculating to obtain the skewed angle $\theta_t$ according to the interval L and the difference of the first moving value Y1 and the second moving value Y2, that is:

$$\theta_t = \sin^{-1}(Y2-Y1)/L$$

In some embodiments, in the step S60, an estimated correction angle $n\theta$ is obtained by calculating according to a target value of the specific direction D, the skewed angle $\theta_t$ and an image length H of the captured image A through the image capture device 1. Furthermore, a correction angle $\theta'$ is obtained by calculating the estimated correction angle $n\theta$ through a polygon interior angle sum approximation algorithm, and then the correction value is obtained by calculating through a polar coordinate formula according to the target value and the correction angle $\theta'$.

For example, a coordinate value of a pixel point in the captured image A is taken to be set as a target value (x, y) of a target point P, and an image length H of the captured image A is obtained, among which the image length H is an average value of the first moving value Y1 and the second moving value Y2, that is: H=(Y1+Y2)/2. Then, the estimated correction angle $n\theta$ is obtained by calculating in compliance with the proportion principle according to the target value of the specific direction D, which means y, the skewed angle $\theta_t$ and the image length H, that is:

$$n\theta = y \cdot \theta_t / H$$

The estimated correction angle $n\theta$ is skewing an angle $\theta$ relative to the origin point O each time, and skewing n times from the original point O to the estimated point Pe. The estimated correction angle $n\theta$ is between the original point O and the estimated point Pe. However, practically, not every skew is relative to the original point O, so the estimated correction angle $n\theta$ should be calculated through the polygon interior angle sum approximation algorithm, to obtain the practical correction angle $\theta'$.

The calculation process is as below: the practical path of the image skew is taking the original point O as the starting point, skewing angle $\theta$ each time, and reaching the correction point P' after skewing n times. The path and the line segment $\overline{OP'}$ constitute an (n+2)-sided polygon, and the interior angles of the (n+2)-sided polygon are two correction angles $\theta'$ and n angles of $(180°-\theta)$, respectively. Furthermore, by calculating through the formula of the sum of the polygon interior angles, the sum of the interior angles of the (n+2)-sided polygon is: $180°[(n+2)-2]$. Thereby, the equation is obtained that:

$$2\theta' + n(180°-\theta) = 180°[(n+2)-2]$$

Therefore, the correction angle $\theta'$ is obtained by calculating the estimated correction angle $n\theta$ through above polygon interior angle sum approximation algorithm, that is:

$$\theta' = \frac{y}{2}\theta$$

Then, the correction value (x', y') of the correction point P' is obtained by calculating through the polar coordinate formula according to the target value (x, y) of the target point P and the correction angle $\theta'$, that is:

$$\begin{cases} x' = x\cos\theta' - y\sin\theta' \\ y' = x\sin\theta' + y\cos\theta' \end{cases}$$

After the accurate correction value (x', y') is obtained, the target value (x, y) can be replaced with the correction value (x', y') to correct the skewed captured image A. Through above calculation process, accurate correction values are obtained, such that the captured image A is precisely corrected.

From the above description, the present invention provides an image capture and correction method. By allowing the image capture device to obtain the position information, and calculating to obtain a skewed angle according to the position information, the errors occurred while operating the image capture device or detecting the displacement are corrected. Furthermore, through setting each coordinate value of the captured image as a target value and replacing the target value with the correction value, the skew of the captured image is corrected precisely. Meanwhile, by calculating the target value and the skew angle through a polygon interior angle sum approximation algorithm and a polar coordinate formula, an accurate correction value is obtained, and the advantage of precisely correcting the captured images is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capture and correction method, comprising steps of:
   (a) providing an image capture device;
   (b) moving the image capture device along a specific direction to obtain a captured image and position information;
   (c) performing a correction operation to the captured image;
   (d) calculating to obtain a skewed angle according to the position information;
   (e) setting a coordinate value of the captured image as a target value;
   (f) calculating to obtain a correction value according to the target value and the skewed angle;
   (g) replacing the target value with the correction value; and
   (h) judging whether to continue the correction operation;
   wherein if the result of the judgement of the step (h) is True, the step (e), the step (f), the step (g) and the step (h) are re-performed after the step (h), and wherein if the result of the judgement of the step (h) is False, the correction operation is finished and the corrected captured image is stored.

2. The image capture and correction method according to claim 1, wherein the image capture device further comprises:
   a control unit; and
   a first optical mouse sensor and a second optical mouse sensor connected with the control unit to obtain the position information.

3. The image capture and correction method according to claim 2, wherein the image capture device further comprises:
   an image capture unit connected with the control unit to obtain the captured image; and
   a storage unit connected with the control unit to store the captured image and the position information.

4. The image capture and correction method according to claim 2, wherein the position information comprises a first moving value obtained through the first optical mouse sensor moving along the specific direction, and a second moving value obtained through the second optical mouse sensor moving along the specific direction.

5. The image capture and correction method according to claim 4, wherein the first optical mouse sensor and the second optical mouse sensor have an interval between each other, and the step (d) is a step of calculating to obtain the skewed angle according to the interval and the difference of the first moving value and the second moving value.

6. The image capture and correction method according to claim 1, wherein the step (f) is calculating to obtain the correction value through a polar coordinate formula according to the target value and the skewed angle.

7. The image capture and correction method according to claim 6, wherein the step (f) is a step of calculating to obtain a correction angle according to the target value, the skewed angle, and an image length of the captured image, and calculating to obtain the correction value through the polar coordinate formula according to the target value and the correction angle.

8. The image capture and correction method according to claim 7, wherein the step (f) is a step of calculating to obtain an estimated correction angle according to a target value of the specific direction, the skewed angle and the image length, and calculating the estimated correction angle through a polygon interior angle sum approximation algorithm to obtain the correction angle.

9. The image capture and correction method according to claim 1, wherein the step (h) is a step through judging whether each coordinate value of the captured image is set to decide whether to continue the correction operation, wherein when not each coordinate value of the captured image is set, the result of the judgement of the step (h) is True, and the correction operation is continued, and when each coordinate value of the captured image is set, the result of the judgement of the step (h) is False, and the correction operation is finished.

10. The image capture and correction method according to claim 1, wherein in the step (g), when the correction value is out of the range of the captured image, the target value is replaced with 0 or a specific value.

* * * * *